April 15, 1930. A. S. KANTER 1,754,685
ELECTRIC WINDING WITH VARIABLE PITCH
Filed May 10, 1928
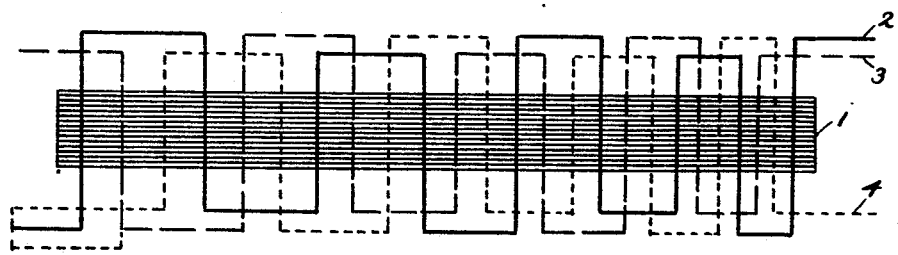
ABRAM S. KANTER
INVENTOR
BY John P. Nikonow
ATTORNEY Patented Apr. 15, 1930

1,754,685

UNITED STATES PATENT OFFICE

ABRAM S. KANTER, OF MOSCOW, UNION OF SOVIET SOCIALIST REPUBLICS, ASSIGNOR TO STATE ELECTROTECHNICAL TRUST, OF MOSCOW, RUSSIA

ELECTRIC WINDING WITH VARIABLE PITCH

Application filed May 10, 1928, Serial No. 276,570, and in Germany April 6, 1927.

My invention relates to electric windings with variable pitch and has a particular reference to polyphase or single phase windings forming alternate poles and used in alternating current machines, such as motors and generators; and more particularly my invention relates to such windings formed on straight cores and used for obtaining rectilinear motion.

The spacing of poles or pole pitch determines the speed of movement of a secondary winding in relation to the primary winding. In rotating machines usually it is necessary to have a constant speed of rotation, so that the spacing or pitch of the poles is made uniform. For this reason the pitch of windings which determines the location of poles is also made uniform. The pitch of individual coils of the winding may vary to a certain extent, but these variations, as a rule, are also uniform, so that the speed of the rotating member of the machine is uniform. This speed is proportional to the frequency of the electric current and to the pole pitch or inversely proportional to the number of poles. This may be seen from the well known formulæ:

$$\text{Speed } V = \frac{\pi D n}{60} \quad\quad (1)$$

$$\text{Frequency } F = \frac{pn}{60} \quad\quad (2)$$

Substituting we obtain:

$$V = \frac{\pi D 60 F}{60 p} = 2TF \quad\quad (3)$$

Here $2p$ denotes number of poles, $n$—number of revolutions per minute, and $T$—pole pitch. The formula (3) indicates that the speed is directly proportional to the pitch for any kind of movement, whether rotative or rectilinear.

The windings of this type are sometimes placed on a straight core in order to obtain rectilinear movement as in electric hammers. In this case a constant pitch winding has certain disadvantages, especially at the starting point. In order to obtain a high speed of movement at the end of the winding, where the hammer must acquire a great velocity, the pitch must be made correspondingly large. Such large pitch, however, is not suitable for the point where the movement of the hammer begins. On account of a very large slip the efficiency at the start becomes so low that sometimes it is difficult to obtain any movement at all.

Several methods have been tried to obviate this difficulty. One of them was to separate the windings in sections and to feed separate currents in these sections, these currents being of different frequencies, low for the beginning of the movement and high—for the end. An obvious disadvantage of such method lies, of course, in the complicated arrangement of circuits and contacts.

With my arrangement I am using insulated windings with variable pitch, progressively increasing from the beginning to the end, as illustrated in the accompanying drawing, which represents a straight magnetic core 1 made preferably of laminated sheet steel punchings. In slots of this core windings 2, 3 and 4 are placed connected at the end to form a star connected three phase winding. it is understood, of course, that any other type of a polyphase or single phase winding may be used with any other known methods of connections, such as delta, etc.

Different phases have windings shown differently on the drawing: one phase is shown with a solid line, second phase with dashes, and the third phase—with a dotted line. These windings are so distributed that the distance between consecutive phase belts increases progressively, the phase belts themselves also progressively increasing in size.

The pitch of the winding varies progressively from the beginning at the right to the end at the left where it is the largest, corresponding to the high speed required for the hammer at the end of its travel.

Important advantages of my invention, as applied to electric hammers, are that the hammer is accelerated gradually and brought to the final high speed with an approximately constant slip and with a correspondingly increased efficiency. The start of the movement is positive, with a high torque, and the acceleration also positive and smooth.

I claim as my invention:

1. A polyphase motor element comprising the combination with a magnetic core, of an insulated multipolar polyphase winding, so distributed that the distance between consecutive phase belts increases progressively.

2. A polyphase motor element comprising the combination with a magnetic core, of an insulated multipolar polyphase winding, so distributed that the distance between consecutive phase belts increases progressively, and the size of said belts also increases progressively.

Signed at Berlin, Brandenbury, Prussia, this 16th day of April, A. D. 1928.

ABRAM S. KANTER.